Figures 1, 2:
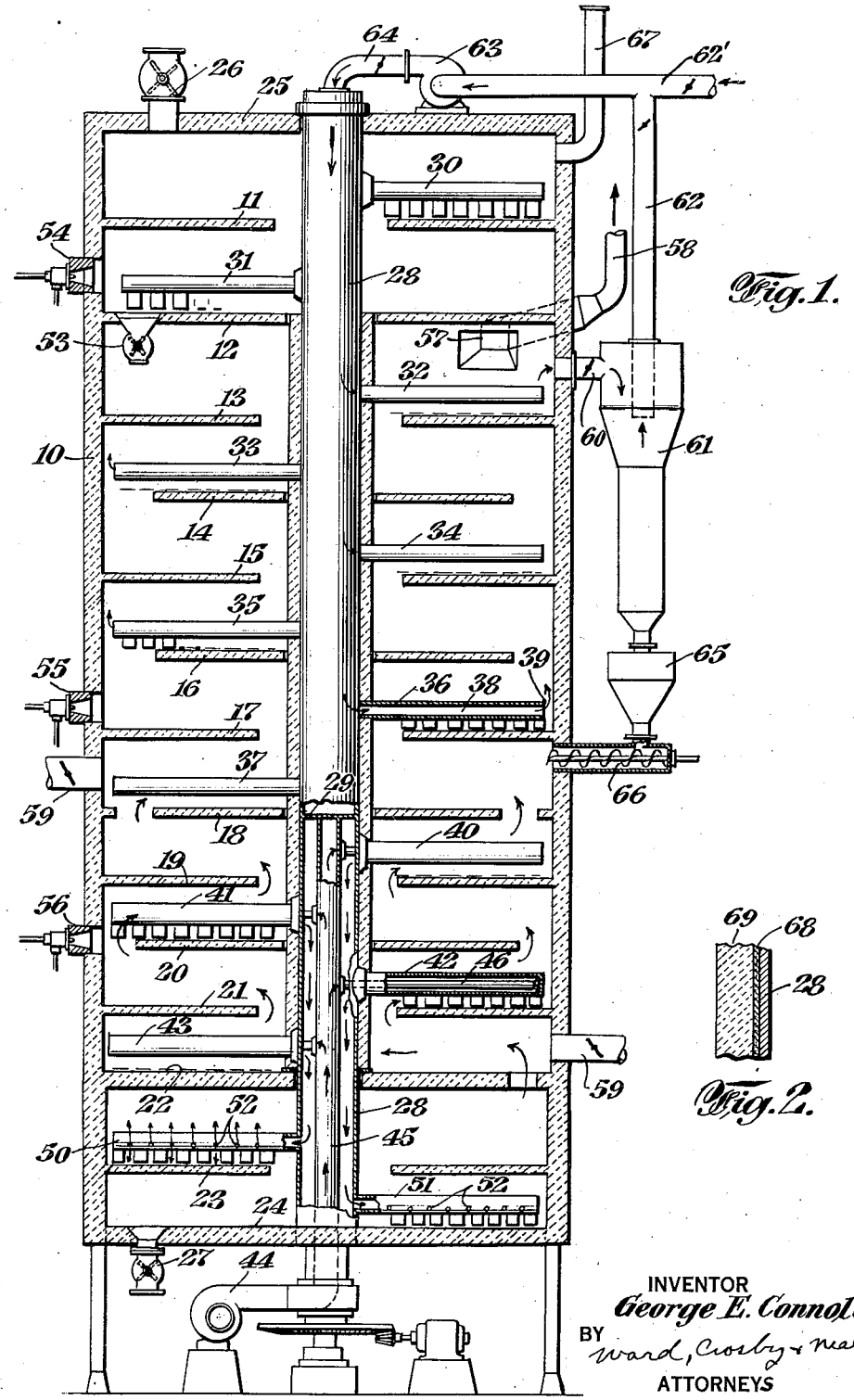

INVENTOR
George E. Connolly
BY Ward, Crosby & Neal
ATTORNEYS

Patented Jan. 13, 1942

2,269,580

UNITED STATES PATENT OFFICE 2,269,580

FURNACE APPARATUS AND METHOD OF CALCINING LIME WITH RECOVERY OF CARBON DIOXIDE

George E. Connolly, Oakland, Calif., assignor to Nichols Engineering & Research Corporation, New York, N. Y., a corporation of Delaware Application June 14, 1940, Serial No. 340,458

4 Claims. (Cl. 263—26)

This invention relates to furnace apparatus, and methods for calcining materials and recovery of resulting gases. More particularly the invention relates to improved multiple hearth furnace apparatus of a type adaptable for example to the calcining of lime and the concurrent recovery of gases rich in carbon dioxide.

Multiple hearth furnaces of the class having a rotatable fluid cooled rabbling structure, are well known. In such furnaces it is customary to cool the rabble arms and the rotatable shaft carrying the arms by providing these parts with internal cavities and conduits whereby supplies of cooling air may be blown therethrough. However, if this air supply after being heated by passage through the rabbling structure is discharged to the atmosphere, there will be in consequence a substantial waste of heat. On the other hand, if such heated air is discharged from the rabbling structure into the furnace, then in some cases this will represent an excess amount of air over and above the requirements of the process being carried out in the furnace. This will not only involve a waste of heat in raising the temperature of an excess amount of air, but also if the gases evolved from the process are to be recovered, the same may be excessively diluted by such introduction of excess air. In other cases the introduction of heated air from the rabbling structure into the presence of the material being treated in the furnace may be undesirable or impossible, at least at some hearths, because of the nature of the process, as where it may be desired to prevent or minimize oxidation. In other cases the use of fresh air supplies for cooling the rabbling structure, involves disadvantages in that a considerable quantity of air is needed to insure that it will reach the cooling cavities of all of the rabbling arms, and if such quantities are introduced at room temperature for example, the cooling action on the rabble arms and shaft may be considerably in excess of what is really needed, thus involving waste of heat from the furnace.

According to the present invention the above difficulties may be overcome by using the gas, or a part of the gases evolved from the material being treated or calcined, such gas or gases or a portion thereof being preferably withdrawn from a zone of intermediate temperature within the furnace, and introduced into the cooling cavities of the rabbling structure, or parts of the rabbling structure, and thereafter discharged again into the furnace. In this way at least the portions of the rabbling structure which are not subjected to the highest temperatures, may be sufficiently cooled by recirculating therethrough gases evolved in the process, thus avoiding dilution of such gases with the introduction of further air and at the same time avoiding the loss of heat from the furnace through the use of excess air or the discharge of air used for cooling purposes. In some cases it will also be found that the gases thus used will provide a cooling medium more efficient than air for the purpose.

Various further and more specific objects, features and advantages will clearly appear from the detailed description given below taken in connection with the accompanying drawing forming a part of this specification and illustrating by way of example one form of apparatus which may be used in carrying out the invention. The invention consists in such novel features, arrangements, combinations of parts and methods, as may be shown and described in connection with the apparatus herein disclosed.

In the drawing, Fig. 1 is a vertical sectional view showing a preferred furnace construction made in accordance with the invention; and Fig. 2 is a detailed sectional view illustrating means for insulating and protecting a portion of the rabbling structure.

In the structure shown a cylindrical furnace wall 10 surrounds and supports a plurality of superposed circular hearths comprising, for example, hearths 11 and 12 for providing a preheating zone, hearths 13—18 inclusive for forming an upper calcining zone, hearths 19—22 inclusive for forming a lower calcining zone, and finally hearths 23, 24 for forming a lower cooling zone. The furnace is shown provided with a top portion 25 having a suitable inlet feeding device 26. The lower hearth 24 may comprise the bottom of the furnace and be provided with a suitable gas sealed outlet as at 27. It will be understood that the number of hearths within each zone may be varied to suit different conditions and depending upon the areas of the hearths and other factors which will be understood by those skilled in the multiple hearth furnace art. In case the material to be treated is relatively dry, the preheating zone may be dispensed with.

A rotatable hollow central shaft is shown at 28, carrying numerous rabble arms as shown, for cooperating with each of the several hearths, the rabble arms being preferably all provided with teeth of any desired well-known construction and the arm walls being suitably insulated if desired, in the high temperature zones. A partition 29 in the shaft 28 separates the cavities within the rabbling structure of the lower calcining zone, from the cooling cavity in the shaft section for the upper calcining zone.

Rabble arms as at 30, 31 within the preheating zone need not ordinarily be provided with cooling conduits. Each of the rabble arms as at 32—37 inclusive in the upper calcined zone may be formed with a single cooling cavity as at 38 extending longitudinally from end to end permitting gas from the hollow shaft 28 to enter and pass through the arm and out through discharge openings as at 39 at the outer ends of each of these arms.

The rabble arms as at 40—43 within the lower calcining zone where high temperatures occur, may be provided with cooling cavities and conduit connections for passing therethrough a supply of cold air as from a blower 44. That is, with this part of the rabbling structure the air from the blower 44 may pass up through a central conduit 45 within the lower section of shaft 28, thence through internal cooling conduits as at 46 to the ends of the rabble arms 40—43, thence back through the annular spaces surrounding conduits 46, 45 and down to rabble arms as at 50, 51 located in the cooling zone. The rabble arms 50, 51 may be formed with outlet perforations as at 52 for discharging the warmed air which has been used for cooling the lower part of the rabble structure, directly into the presence of the material being cooled on the lowermost or cooling hearths.

The hearth 12 may be provided with a discharge opening containing a suitable feeding device as at 53, preventing the passage of gases from the calcining zones up into the preheating zone. All of the other hearths within the furnace may be provided with either central or peripheral discharge openings, permitting the material to fall from hearth to hearth down through the furnace under the action of the rabble teeth on the rabble arms, which periodically agitate and gradually advance the material either inwardly or outwardly over each hearth in succession in a manner well understood in the multiple hearth furnace art.

Necessary heat may be supplied to the various parts of the furnace as by oil burners for example, including the burner 54 located in the lower part of the preheating zone, burner 55 located within the lower portion of the first calcining zone, and a burner 56 located in the mid portion of the second calcining zone. It will be understood that gases evolved from the material being treated as well as any air present, and gaseous products of combustion from the fuel, may pass over each hearth in succession and upwardly through the hearth discharge ports countercurrent to the flow of the material being treated on hearths 13—24. These gases are finally discharged from the furnace through an opening 57 and a conduit 58.

In case the air introduced into the furnace in connection with the fuel burners and the air introduced into the lower part of the furnace through the rabble arm perforations 52 is insufficient, then additional air if desired may be introduced as through an opening or openings as at 59.

In order to provide a supply of gases for the cooling of the upper section of the shaft 28 and the rabble arms 32—37, a part of the gases within the upper calcining zone may be withdrawn as through a conduit 60, thence through a dust removing device 61, conduit 62, blower 63, and a conduit 64 connected to the upper or inlet end of the hollow shaft 28. The device 61 may be of a suitable known type of dust collector operating for example by establishing a vortex for centrifugally separating the dust from the gas, whereby the dust may be conducted into a settling chamber 65 and thence returned to the upper calcining zone as by a screw conveyor 66. Thus the dust is kept from entering the cooling cavities of the rabble structure where in time it might clog the passages to a prohibitive degree.

It will be noted that the above described arrangement provides a means for recirculating a desired portion of the gases evolved from the process through the rabbling structure or a portion thereof and back into the presence of the material being treated in the furnace. Since these gases are withdrawn from an upper portion of the calcining zone, where the temperatures are considerably below those of the hottest regions of the furnace, these gases after passing through the dust collector and conduits, will be at a temperature low enough to effectively cool or prevent the upper section of the rabbling structure from being injured by heat. Also since the gases as thus recirculated are not cold, but are heated at least to some extent, there will be no tendency for cooling the rabbling structure to an excessive degree with consequent loss of efficiency in the furnace. And since the gases after leaving the rabbling structure are discharged into the furnace, the additional heat acquired thereby in lowering the temperature of the rabbling structure, is kept within the furnace and not wasted. The amount of gases thus recirculated through the rabbling structure may be adjusted as by dampers in the conduits 60 and 64 as shown, or by varying the speed of the blower or fan 63.

The vapor, air and gases from the hearths 11 and 12 may be discharged as through a conduit 67, running to a stack.

The portions of the central shaft 28 which are located within the higher temperature zones of the furnace may be protected with a layer of insulation as at 68 (Fig. 2) comprising for example asbestos, and surrounded by a protective covering or casing of cast refractory material as at 69.

The above described apparatus is particularly adaptable to produce an oxide calcine and an evolved gas rich in carbon dioxide, the material fed to the furnace being a carbonate such as lime. For example, in beet sugar plants, supplies of spent sugar-house lime are available and it is desirable to recover this material by calcining and at the same time to produce an exit gas containing in the neighborhood of 30% carbon dioxide by volume. For this purpose the spent lime sludge may be introduced into the preheating zone and there raised to a temperature, for example, of 150 to 300° F. and its moisture content reduced for example to 0–5%. Then the material enters onto hearth 13 where the gas temperatures may for example be from 400 to 800° F. As the material passes successively over hearths 13—18, it is superheated to an extent sufficient for the dissociating purposes, for example to temperatures on hearth 18 of from 1500 to 1700° F. Then upon the hearths 19—22, the material reaches its highest temperatures for final calcining treatment, for example 1600 to 1800° F. At these latter hearths the gas temperatures may be, for example, 1700 to 1900° F.

Finally at the cooling hearths 23, 24 the material is subject to cooling action by the air expelled from the arm perforations 52 and this cooling air which has been partially heated in going through the rabbling structure is thereby further raised in temperature before it passes up into the calcining zones.

The gases which are withdrawn through the outlet 58 as well as the part of the gas which is to be recirculated through conduit 60, may leave the furnace at a temperature of from 500 to 800° F. The latter gas as it enters the top of the shaft 28 may be of a temperature for example of 450 to 700° F. and upon its discharge through rabble arm openings 39 it may be of a temperature varying from 450 to 800° F.

Since carbon dioxide, when recirculated through the rabbling structure at temperatures such as above indicated, has a relatively high thermal conductivity, it provides an especially effective cooling medium.

In some cases it may be found desirable to provide some or all of the carbon dioxide or equivalent cooling gas for the rabbling structure of the upper calcining zone, from some source outside the furnace. In such event the gas for this purpose may be introduced as through a pipe 62'. This plan is feasible for example for some beet sugar plants where a gas having a high content of carbon dioxide is available from other equipment of the plant. By using such gas, the content of carbon dioxide in the gas producing furnace may be substantially increased.

Although the rabble arms in the lower calcining zone may be of the conventional two-directional flow air cooled type, the air therefor may be made equal to or less than the combustion requirements for the fuel burned in the calcining zones of the furnace. Preferably in the neighborhood of 70% of the air required for combustion of the fuel may be introduced by way of the rabble arm perforations 52, the remaining air requirements for combustion being met by introducing air at the burners at room temperature.

While the invention has been described in detail with respect to a particular preferred example, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. In combination with a furnace having a plurality of superposed hearths, a central rotatable vertical shaft with rabble arms thereon at each hearth for advancing material being treated over each hearth and from hearth to hearth, said shaft and arms having openings and communicating cavities for admitting and conducting cooling fluid into and through the shaft and thence through the arms and from the arms to the spaces over each hearth, the hearths being formed with openings to permit a flow of gases upwardly in the furnace countercurrent to the travel of the material, means for heating lower hearths to a higher temperature than upper hearths, and means for conducting gas resulting from the heating of the material on the hearths, while such gas is still warm, from the presence of an upper hearth, to the inlet opening of the shaft to serve as such cooling fluid.

2. In combination with a furnace having a plurality of superposed hearths, a central rotatable vertical shaft with rabble arms thereon at each hearth for advancing material being treated over each hearth and from hearth to hearth, one section of said shaft and the arms at said section having openings and communicating cavities for admitting and conducting cooling fluid into and through the same and for discharging such fluid within the furnace, means for conducting gas resulting from the heating of the material on the hearths, to the inlet opening of such shaft section to serve as such cooling fluid, another section of said shaft and accompanying arms within a higher temperature zone of the furnace, being formed with a separate system of cooling conduits, and means for supplying cooling air into the latter conduits.

3. In combination with a plurality of superposed furnace hearths, a central rotatable vertical shaft with rabble arms thereon at each hearth for advancing material being treated over each hearth and down from hearth to hearth, the hearths being formed with openings to permit an upward flow of gases countercurrent to the travel of the material, said shaft and arms having openings and communicating cavities for admitting and conducting cooling fluid into and through the shaft and thence through the arms and for discharging such fluid within the furnace, means for heating the lower hearths to a temperature higher than the upper hearths, a device for removing dust from gases, and means for passing gas resulting from the treatment of the material on the hearths, from the presence of an upper hearth through said device and to the inlet opening of said shaft to serve as such cooling fluid.

4. The method of calcining lime and recovery of gases rich in carbon dioxide, in a multiple zone furnace having rotary fluid cooled rabbling structure, which comprises advancing the lime while agitating the same, through successive calcining regions of increasing temperatures in the furnace and countercurrent to a flow of heated air and evolved gases including carbon dioxide, and utilizing a part of such flow as the fluid cooling medium within the rabbling structure for the preliminary calcining regions, by circulating such part from the latter regions through the latter rabbling structure, and back into the presence of the lime being calcined.

GEORGE E. CONNOLLY.